(No Model.)
V. M. FULCHER.
INDICATOR FOR SCALES.
No. 252,452. Patented Jan. 17, 1882.
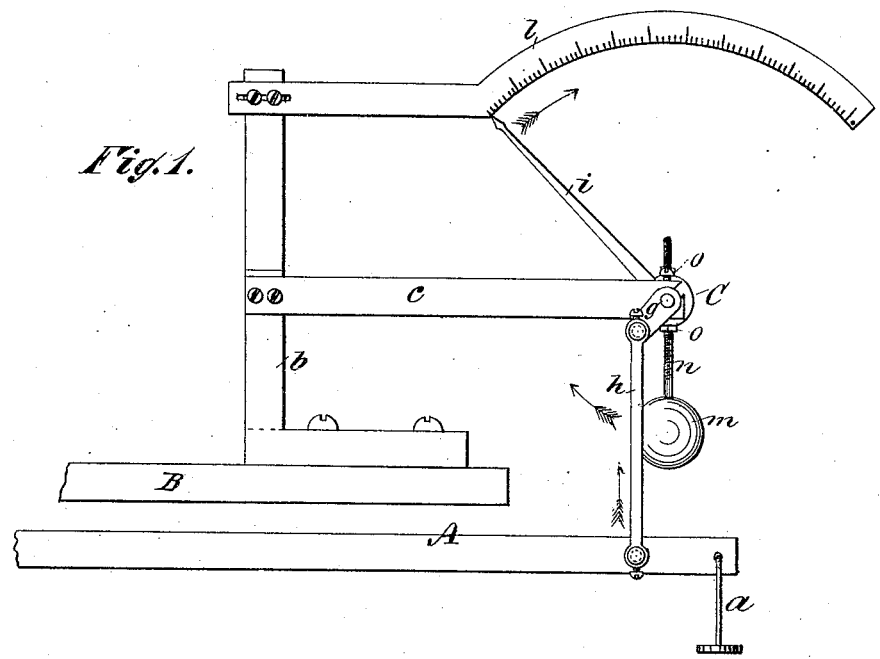
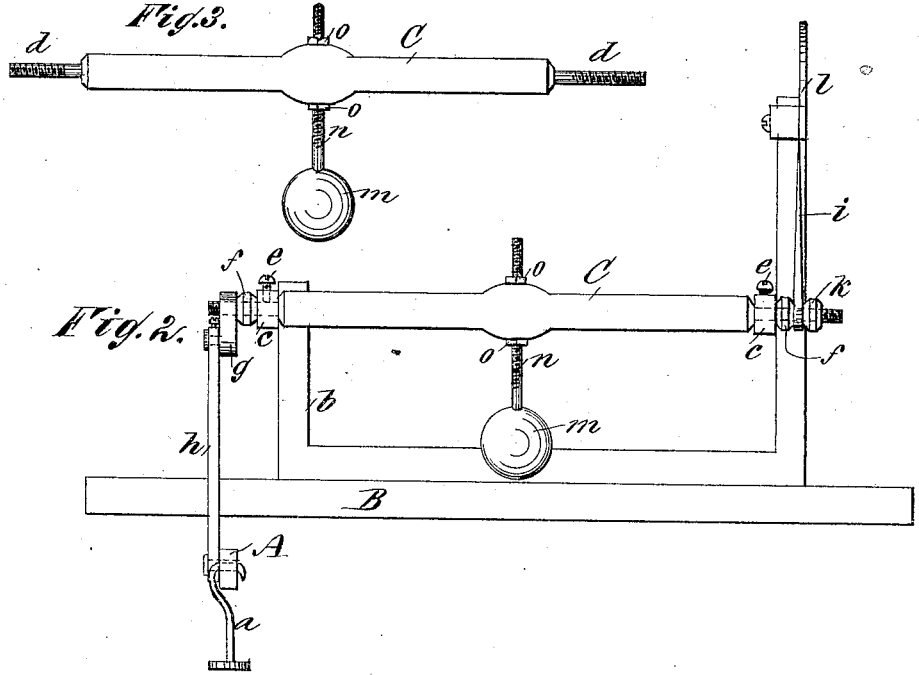
WITNESSES:
INVENTOR:
V. M. Fulcher
BY Munn & Co
ATTORNEYS.

UNITED STATES PATENT OFFICE.

VALENTINE M. FULCHER, OF HUGHES SPRINGS, TEXAS.

INDICATOR FOR SCALES.

SPECIFICATION forming part of Letters Patent No. 252,452, dated January 17, 1882.

Application filed August 24, 1881. (No model.)

*To all whom it may concern:*

Be it known that I, VALENTINE M. FULCHER, of Hughes Springs, in the county of Cass and State of Texas, have invented a new and useful Improvement in Indicators for Scales, of which the following is a full, clear, and exact description.

My improvements relate to platform and other beam scales, and have for their object to dispense with the slides heretofore used and provide for automatic indication of weight.

The invention consists in a weighted rocker and indicating-arm combined with a scale-beam for operation thereby, as hereinafter described and claimed.

In the accompanying drawings, Figure 1 is a side elevation of my improved devices applied to a scale-beam. Fig. 2 is a front view of the same parts; and Fig. 3 shows the rocker detached.

Similar letters of reference indicate corresponding parts.

In the drawings, A is the beam of a platform-scale of any usual construction, having a pendant, $a$, as usual, but without any notches or graduations, as they are not required.

B is the usual board covering the beam, on which is fixed a standard, $b$, that is provided with fixed horizontal arms $c$, extending toward the end of beam A.

C is a rocker, the same being a bar provided with pintles $d$ $d$ at its ends, that enter holes or slots in the ends of arms $c$, so that the rocker is supported by the arms. $e$ $e$ are set-screws tapped into the slots of arms $c$ to prevent the pintles $d$ from rising, and $f$ $f$ are nuts on the pintles $d$ to prevent endwise movement of the rocker. On one end of rocker C is fixed a crank-arm, $g$, from which a rod, $h$, passes to and is connected to the beam A. On the opposite end of rocker C is an arm or pointer, $i$, held by a set-nut, $k$. Above the pointer, and connected to standard $b$, is a curved arm or piece, $l$, which is provided with a graduated scale marked in pounds and fractions thereof.

The rocker C is provided with a pendent weight, $m$, attached by a rod, $n$, that passes through the rocker, and is held by nuts $o$ $o$, so that it can be adjusted.

The parts are to be adjusted so that when the beam is down the weight $m$ hangs directly beneath the rocker and the pointer $i$ stands at the zero-point of the scale.

In operation, weight being placed on the platform of the scale, the beam A is moved upward more or less, and by the connecting-rod and crank the rocker is turned to correspond, and the pointer $i$ thus moved over the scale on arm $l$. The weight is thus indicated automatically. The weighted rod $n$ regulates the movement of the rocker and beam, and its resisting power necessarily increases as it swings upward.

By lengthening or adjusting rod $n$ the range of the scale can be varied.

For weighing beyond the range of the scale weights will be placed on the pendant $a$, and the indicator will show the excess.

This indicating mechanism, being moved by positive connections without springs, is both reliable and durable, and can be readily applied to any beam scale.

Having thus described my invention, I claim as new and desire to secure by Letters Patent—

In scales, the combination, with the scale-beam A and the notated arc-arm $l$, of the rocker C, carrying the weight $m$ on an adjustable arm, $n$, and having the threaded-end spindles $d$, passing through slots of the arms $c$, the set-screws $e$, the nuts $f$, the crank-arm $g$, connected by rod $h$ with the scale beam A, the pointer $i$, and the set-nut $k$, as shown and described.

V. M. FULCHER.

Witnesses:
S. E. NESBETT,
J. F. JONES.